J. J. SCHMITZ.
WHEEL.
APPLICATION FILED FEB. 27, 1905.
917,967.
Patented Apr. 13, 1909.
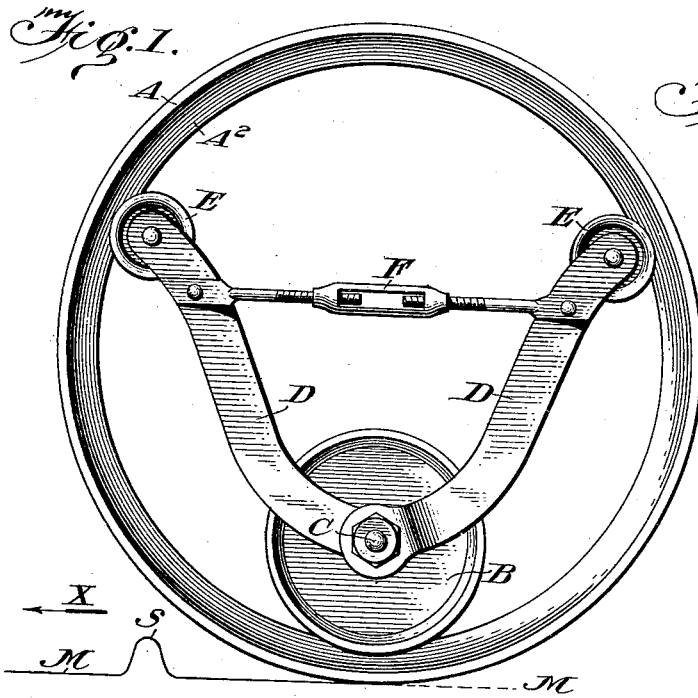
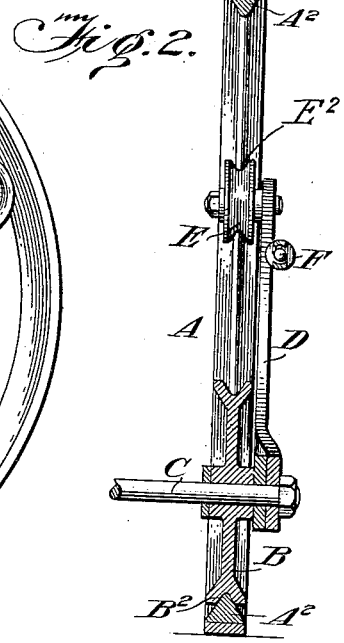
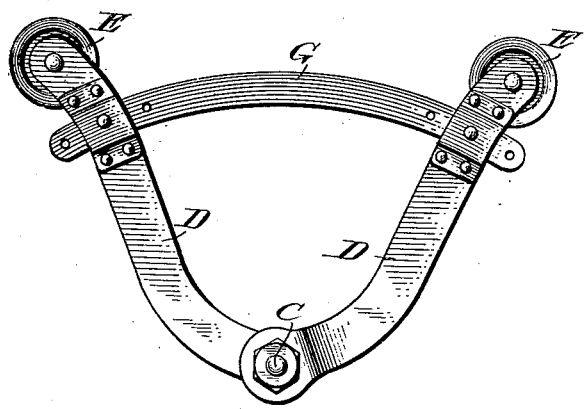
Witnesses:
Edward H. Larier
N. Smith
Inventor:
John J. Schmitz
per Wm. Hubbell Fisher
Atty.

UNITED STATES PATENT OFFICE.

JOHN J. SCHMITZ, OF CINCINNATI, OHIO.

WHEEL.

No. 917,967.　　　Specification of Letters Patent.　　　Patented April 13, 1909.

Application filed February 27, 1905. Serial No. 247,581.

*To all whom it may concern:*

Be it known that I, JOHN J. SCHMITZ, a citizen of the United States, and a resident of Hyde Park, in the city of Cincinnati, in the county of Hamilton and State of Ohio, have invented new and useful Improvements in Wheels, of which the following is a specification.

The principal object of my invention is to greatly diminish and for the most part substantially obviate what is known as the vertical thrust which is imparted to a wheeled vehicle when riding over rough and uneven roads, tracks or other surfaces.

The several features of my invention and the various advantages resulting from its use conjointly or otherwise will be apparent from the following description and claims.

In the accompanying drawings making part of this application in which similar letters of reference indicate corresponding parts,—Figure 1 represents a side elevation of mechanism illustrating my invention. Fig. 2 represents a vertical, central transverse section of the mechanism shown in Fig. 1, the main axle, its nut and pins being left in elevation. Fig. 3 represents in elevation a modified construction of one of the features of my invention.

I will now proceed to describe my invention in detail. I provide an annular rim A. The diameter of this rim A is to be varied according to the kind of vehicle to which my invention is to be applied, and according to the character of the road or surface over which the vehicle is to be moved. The reasons for this variation in size will appear hereafter more fully in detail. I provide a wheel B of smaller diameter than that of the rim A, and I locate this smaller wheel within this rim A. I adapt the inner side of the rim A and the periphery of the small wheel B so that the wheel B is enabled to ride upon the rim A.

The manner of construction of those parts of the rim A and wheel B that are to come into contact with one another may be varied. A preferred construction of these parts of the rim A and of the wheel B is as follows. I provide the inner side of the rim A with a bead or ridge $A^2$. The top or inner edge of this ridge $A^2$ is in cross section curved rather than acute, so that it thus shall afford a better bearing for the tread of the wheel B.

The periphery of the wheel B has a groove $B^2$ extending around the entire wheel. This groove $B^2$ receives the ridge $A^2$ of the rim A, and the surface of this groove at and near the bottom of the latter constitutes the tread of the wheel B. The plane of the annular rim A is vertical substantially as shown, and the wheel B is likewise vertical. To keep the wheel B in line with the rim A, that is to keep the wheel B so that the plane of its circle shall be parallel to the plane of the circle of the rim A, I provide the following construction. The wheel B is mounted on an axle C. From this axle, I extend the arms D, D. Each arm D is rigidly fixed relatively to the other arm D. For this reason, among others, I preferably connect them rigidly together at the axle C. They may thus be cast, forged or stamped so as to be integral. Where the axle of the wheel B rotates with it, then the arms must be loose upon the axle, as they must not be compelled to rotate with the axle. When the axle of the wheel B is loose within wheel B, and the latter turns around the axle, then the arms may be fixed to said axle or be loose thereon.

Where the wheels are in duplicate, one at each side of the vehicle and the axle of the one wheel is the axle of the other, it is desirable that the arms be loose upon the axle. Otherwise, when the wheel at one side met an obstruction and the other did not, the arms at both sides would have to travel alike. This would interfere with the free action of each wheel.

It is my intention that each rim and wheel shall independently of the other wheels accommodate itself to the particular irregularities of the surface of the ground over which the vehicle travels.

Where as in a tricycle, etc., there is one wheel by itself, then the arms may be fast on the axle, if the latter turns within its wheel.

The free end of each arm D carries a wheel E adapted to run against the rim A, and preferably does engage and run upon the rim, in the same manner as the wheel B does. Each wheel E therefore has a peripheral groove $E^2$, that receives the ridge $A^2$. Thus the wheels E and the wheel B ride in place, securely in conjunction with the rim. After use, the ridge $A^2$ of the rim and the wheels E and B will wear more or less. In such event, to obviate the necessity of replacing the old wheels with new ones, I provide an adjusting device or devices whereby the wheels E may be respectively advanced toward the rim, and thus be made to take up the wear. One mode of adjustment consists in moving the arms D, D apart sufficiently, and then setting them in their new position. Such an adjustment presupposes that the arms are free to be moved relatively to each other, at the axle C, or at some point on them between the axle and the wheel E. In the latter event, mechanism for rendering them rigid after adjustment should of course be used.

The mode in which my invention is applied and operates will now be described. For all of the ordinary kinds of vehicle, there will be two of the mechanisms shown in Fig. 1. The axle C will become the axle of both wheels B. Upon the axle C is now mounted the vehicle. The axle bearings may be on the axle C, between the wheels B, or outside of the wheel, upon extensions of the axle. Such extensions are well known, as in car wheel axles, and the like. Further mention of them is therefore omitted. As the vehicle moves in the direction in which the arrow X points, the wheels B roll forward in that direction, and so do the respective rims. For perspicuity of description, the mode of operation will now be confined to one of these duplicate mechanisms; premising that the operation thereof is the same at both sides of the vehicle.

The wheel B has a tendency to roll forward and up on the rim. The weight of the wheels and of the vehicle causes the rim A to rotate and roll toward the arrow X. Now on the surface M, on which the rim rolls, is a hump S. As the rim advances, it will come in contact with this hump. Its advance is to a certain extent checked, and in its necessary advance up and over this hump an upward thrust is communicated to the axial center of this wheel. The wheel B does not receive an equal amount of this thrust. It in fact receives but little of it. It runs along up the forward side of the wheel, raising the vehicle gradually and without communicating any shock to the latter. As the rim A descends on the other side of the hump S, the wheel B rolls gradually down and forward. From the fact that the wheel B is not compelled to move just as does the rim A, it is enabled to readily adjust itself so as not to be too quickly moved either forward or backward. The same operation just described will occur when other humps, projections or depressions are reached by the rim A. So also when the vehicle is moving backward the same operation occurs.

The advantages resulting from the employment of my invention are quite obvious. The persons or things carried by the vehicle are subjected to a much less upward thrust than they would be if my invention were absent. My invention lengthens the life of the vehicle, and contributes to the permanency and durability of the vehicle and of its parts. The diameter of the wheel B relative to the diameter of the rim A may be varied. Where on a road the humps are high and the depressions are deep, the rim A should be large and the wheel B should be small as shown. When the road is substantially smooth, as for example an asphalt street or a railroad track, the rim A may be of much less diameter proportionate to the wheel B, than I have shown in the drawing.

It should also be noted that my invention diminishes the wear of the roadway. For instance, the large rim bridges a depression and therefore does not wear down the edges of the depression, and assist in deepening it, as would be the case when the wheel is small.

What I claim as new, and of my invention and desire to secure by Letters Patent, is:—

1. In a wheel, a surrounding annular rim, a wheel within the rim of less diameter than that of the rim, the wheel adapted to travel upon the inside of the rim, and the arms held at one end to the axle of the wheel, and at their free ends provided with wheels adapted to travel on the rim, and a cross connection secured to said arms, and means in connection with said arms for enabling the arms to be approximated or separated, relatively to the cross connections, substantially as and for the purposes specified.

2. In a wheel, a surrounding annular rim, a wheel within this rim and of less diameter than that of the rim, this wheel adapted to travel upon the inside of the rim, and the arms held at one end to the axle of the wheel, and at their free ends provided with wheels adapted to travel on the rim and means for approximating and separating the said arms and for holding them in their adjusted position, substantially as and for the purposes specified.

3. In a wheel, a surrounding annular rim a wheel within the rim of less diameter than that of the rim, the wheel adapted to travel upon the inside of the rim, and the arms held at one end to the axle of the wheel, and at their free ends provided with wheels adapted to travel on the rim, and a cross connection secured to said arms, the cross connection composed of two rods respectively pivoted to said arms, each rod having a screw thread, and the right and left hand screw coupling nut F, engaging said rods, substantially as and for the purposes specified.

JOHN J. SCHMITZ.

Attest:
  JOHN E. FITZPATRICK,
  K. SMITH.